United States Patent [19]

Diskin et al.

[11] Patent Number: 4,867,764
[45] Date of Patent: Sep. 19, 1989

[54] CONVERTIBLE AIR CLEANER FAN

[75] Inventors: Steve Diskin, Los Angeles; Lawrence Lerner, Beverly Hills, both of Calif.

[73] Assignee: Mega/Erg Inc., Beverly Hills, Calif.

[21] Appl. No.: 157,878

[22] Filed: Feb. 19, 1988

[51] Int. Cl.$^4$ .............................................. B01D 50/00
[52] U.S. Cl. ........................................ 55/126; 55/267; 55/316; 55/467; 55/473; 55/493; 55/385.1; 55/385.8; 415/53.1; 415/126; 415/224; 416/247 R; 416/118
[58] Field of Search ................ 55/385 R, 385 G, 316, 55/467, 267, 473, 493, 126; 415/219 R; 416/247 R, 114, 118

[56] References Cited

U.S. PATENT DOCUMENTS

| | | | |
|---|---|---|---|
| 3,626,669 | 12/1971 | Cardiff | 55/493 |
| 3,725,640 | 4/1973 | Kunz | 415/219 R |
| 3,861,894 | 1/1975 | Marsh | 55/316 |
| 3,923,482 | 12/1975 | Knab et al. | 55/473 |
| 4,045,192 | 8/1977 | Eckstein et al. | 55/473 |
| 4,272,261 | 6/1981 | Lynch et al. | 55/316 |
| 4,341,151 | 7/1982 | Sakamoto et al. | 416/247 R |
| 4,629,479 | 12/1986 | Cantoni | 55/316 |
| 4,737,173 | 4/1988 | Kudirka et al. | 55/316 |

Primary Examiner—Bernard Nozick
Attorney, Agent, or Firm—Charles H. Schwartz; Ellsworth R. Roston

[57] ABSTRACT

A convertible air cleaner comprising an elongated enclosure forming an internal cavity. A first opening is at one end of the enclosure and a second opening is at an opposed end of the enclosure and with the openings oriented substantially at 180° from each other. A support structure holds the elongated enclosure at a substantially center axis between said first and second openings. A pivot permits rotation about said center axis between said first and second openings through an arc of at least 180°. An air filter is contained within the enclosure and a fan is positioned within the enclosure for drawing air through said first opening through the internal cavity for filtration by the air filter for exiting to the exterior of the enclosure through the second opening.

19 Claims, 6 Drawing Sheets

CONVERTIBLE AIR CLEANER FAN

BACKGROUND OF THE INVENTION

1. Field of the Invention

A convertible air cleaner fan unit for desk top use which provides an improved, air purifier/smoke removal device which may be instantly converted to a fan for furnishing a supply of purified and conditioned air to the user. The device improves upon the air flow characteristics of ordinary individual air clearners, and in combination with an integral task light, becomes a unique, useful and compact desk top accessory.

2. Description of the Prior Art

There is much concern being voiced at present about indoor air pollution, deriving primarily from the growing awareness of the danger of cigarette smoking. This concern has expanded to include secondary cigarette smoke, and the outgassing of modern building materials. The problem is particularly acute in sealed office buildings without operable windows, in which air quality depends on the capabilities of the building air handling equipment. Many people complain of eye irritation, mild illness, headaches and the like, which can usually be traced to pollutants in the indoor air. Since individuals' needs vary, a personal air purifier has provided means to achieve at least some individual control and improvement of air quality.

Existing desk top air purifiers are, however, plagued with problems. Most are excessively bulky and take up otherwise-needed desk space. In addition, the existing purifiers are noisy, only work properly in a horizontal position and deal poorly with cigarette smoke. In order for cigarette smoke to be removed effectively, the smoke must be captured near its source. To do this, careful attention must be paid to the configuration of the unit and to the air flow patterns of the unit. In particular, the behavior of exhaust air must be considered since the exhaust air must not interfere with the intake air.

Some of the important air flow considerations are as follows. First, a poorly located exhaust grille can cause incoming smoke to be blown away before it reaches an intake. Second, a high exhaust velocity can generate a Bernoulli effect wherein a region of negative pressure can form outside of the device, and thereby compete with the suction at the intake. This negative pressure phenomenon can be put to good use by arranging for incoming smoke to be directed by the negative pressure to an intake which is located to intercept the smoke along the way. For example, when an exhaust flow of reasonable velocity exits a device at or near desk level, rising smoke nearby has a tendency to move slightly downward due to the negative pressure of the exhaust. The smoke, therefore, can be diverted to a properly located intake. It should also be noted that the intake and the exhaust also must be separated by a sufficient distance. This avoids "short-circuiting" where the device intakes the majority of its own exhaust.

The present invention addresses each of these problems and provides for significant improvements because of particular unique features relative to prior art devices. The conventional desk top air purifier is generally a horizontally disposed box wherein intake air is received by a grille which extends upward for several inches in height from the surface on which the unit is placed. Treated air is then exhausted out the back. Cigarette smoke, which tends to rise by convection, also normally emanates from a height above the height of the intake of the purifier. The smoke, thereby, often misses the intake entirely to diffuses into the ambient air before purification. Much of the smoke, therefore, escapes to the upper reaches of the room to be recirculated without purification.

SUMMARY OF THE INVENTION

In an attempt to deal with the above described problems, the present invention provides for a unit for use by both smokers and nonsmokers. In particular, the present invention provides a high profile, small footprint, convertible unit which not only removes pollutants and smoke from the air, but also can actively supply clean air, heated if desired, in a directable flow, like a desk fan.

The overall configuration of the present invention is designed to perform well in a variety of positions. These includes a vertical position or a cantilevered horizontal position extending from a wall surface to form a modified hood suited to removing smoke-laden air or supplying desirable clean air. The present invention includes an air processing portion which rotates through an arc of 180°, to instantly exchange exhaust and intake functions with respect to the user. An adjustable task light is incorporated in a preferred embodiment of the invention to further enhance the utility of the invention. Since available desk space in office environments is at a premium, and since for smokers, an air purifier should be located at close range, the present invention would normally be placed on a worksurface in the normal close range location for a task lamp. Thus, the combination of these two functions is logical and efficient. In addition, both functions may also be served by a single power cord.

Accordingly, it is a primary object of the present invention to improve the operational efficiency and usefulness of existing personal air purifiers.

A further object of the invention is to provide an improved capability in a small air purifier for collecting cigarette smoke.

Another object is to offer the user, instant convertibility of the air purifier to a desk top fan with an additional temperature control.

Another object of the invention is to combine the air handling portion of the air purifier with an adjustable task lamp, thereby affording a second important desk top utility.

Another object of the invention is to occupy significantly less space than normal air purifiers and to also configure the unit so that it works equally well when wall mounted or positioned on a work surface or desk top.

BRIEF DESCRIPTION OF THE DRAWINGS

FIGS. 6(a) and (b) are diagrammatic representations of the invention on a horizontal surface and in relation to a source of cigarette smoke;

FIGS. 7(a), (b) and (c) are diagrammatic representations of the invention depicting the convertibility of the air cleaning portion of the device by means of the rotation of the main unit, which reverses the location of intake and exhaust;

DETAILED DESCRIPTION

Figure 1:
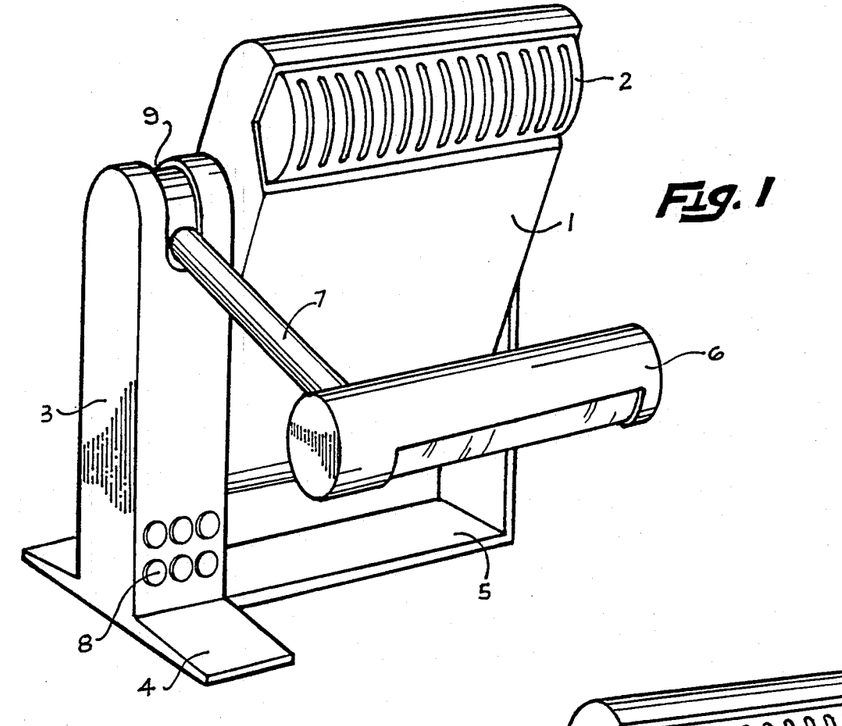
FIG. 1 is a perspective view of the preferred embodiment of a convertible air cleaner fan as set forth in the present disclosure.

FIG. 1 of the accompanying illustrations pictures the preferred embodiment of a convertible air cleaner fan, including an integral lighting unit. The special features and advantages of the invention compared to existing portable air cleaning devices will become evident in the following discussion. In FIG. 1 a main air processing unit (1) contains along its uppermost edge an intake grille (2). Ambient air, and especially cigarette smoke-laden air immediately in front of the device, is taken into the unit through the intake grille (2) for purification. It should be noted that the exhaust grille is positioned at the extreme bottom edge and to the rear of the air processing unit (1) and does not appear in the view shown in FIG. 1 but is shown as exhaust grille (10) in FIGS. 3 through 10. The location or the exhaust grille (10) is ideal since the exhaust is downward of, behind, and generally oriented 180° relative to the intake grille (2) to exhause air in the same direction as the flow of air into the intake grille.

A vertical support housing (3) in combination with a frame (5) provides for the support of the air processing unit (1), and allows the unit (1) to rotate about a horizontal axis to accomplish an instant conversion from air purifier to personal desk fan, by relocating the position of intake and exhaust relative to the user. The entire device is stabilized by base extensions (4) which prevents the device from falling over without taking up excessive desk space.

Also extending from the vertical housing (3) is an arm (7) which is used to support a task lighting fixture (6). The arm (7) is pivotable supported within the structural housing and the height of the lighting fixture (6) may be easily adjusted by raising or lowering the lighting fixture through an arc as the support arm (7) travels in an elongated slot (9) provided in the top of the support housing (3). Control means for controlling various electrical functions are also contained within the support housing (3) and are operated by switches or push buttons (8) on the exterior as shown.

Figure 2:
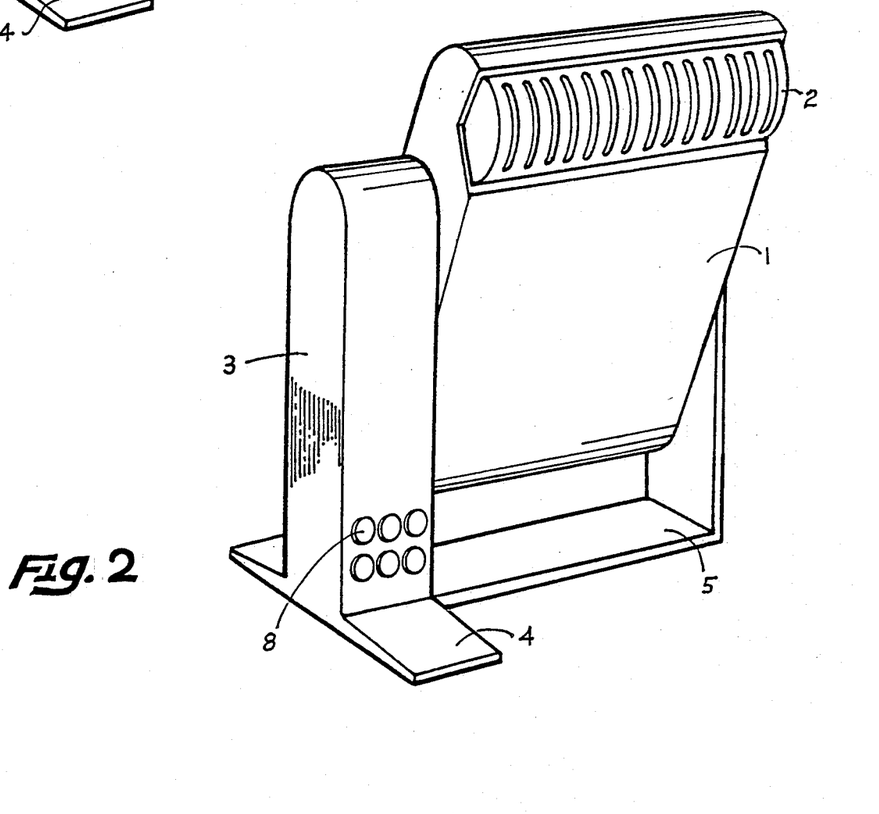
FIG. 2 is a perspective view of a second embodiment of the invention shown without an integral lighting portion.

The inclusion of a task lamp as an integral part of the preferred embodiment of the present invention addresses two problems. First, desk space in present day offices is at a premium and second, there is a need for adequate desk top lighting. Since both lighting and a source of clean air must be in reasonably close proximity to the user, the combining of these two functions in one device is advantageous. It is to be appreciated that while the inclusion of task lighting in the device is desirable, it is not essential. Therefore, FIG. 2 illustrates the device of the present invention with the task light and support arm removed. In this case, the upper portion of the structural housing (3) is solid and no longer is provided with an elongated opening. Note that the air processing unit (1) of the device remains unaltered, as does the frame (5).

Figure 3A:
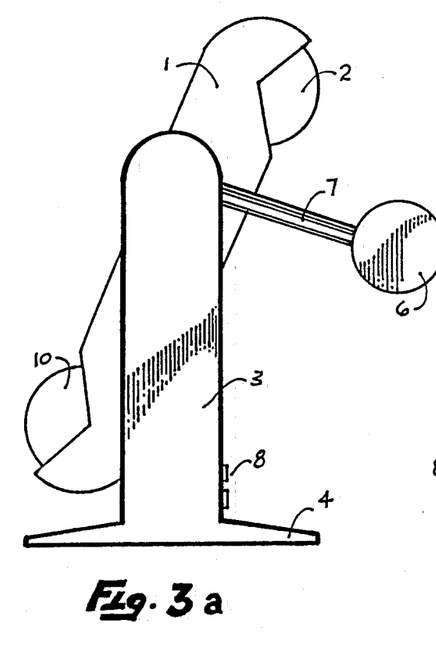
FIGS. 3(a) and (b) show left side and front elevational views of the invention.
Figure 3B:
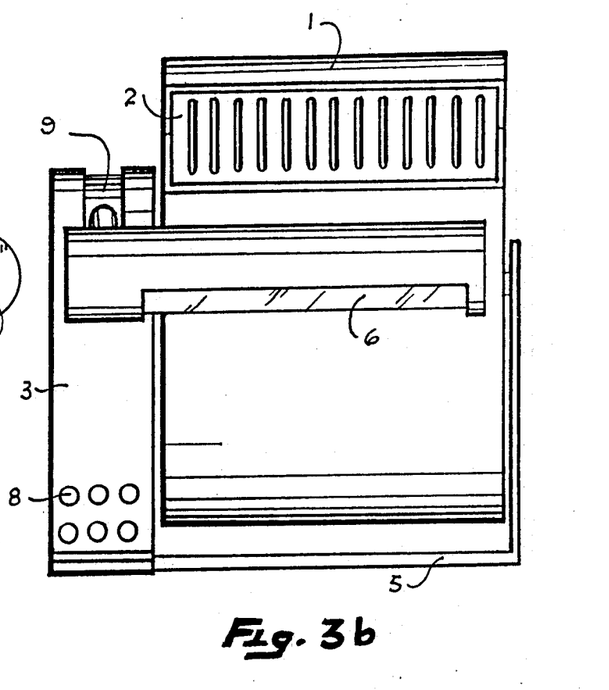

Referring now to FIGS. 3(a) and (b), the present invention is shown in two elevational views. First looking at the left side profile in FIG. 3(a), the device is shown in its g preferred operating position with the air processing unit (1) inclining forward toward the user. In this view the unique shape of the device is clear. The invention is configured with a tall profile, so that the intake grille (2), when the device is in its smoke removal mode, is positioned high on the air processing unit (1). The tall profile has two purposes. First, cigarette smoke is more easily trapped nearer its source as will be discussed later, and the entire unit has a smaller footprint, therefore using less desk space.

Figure 4A:
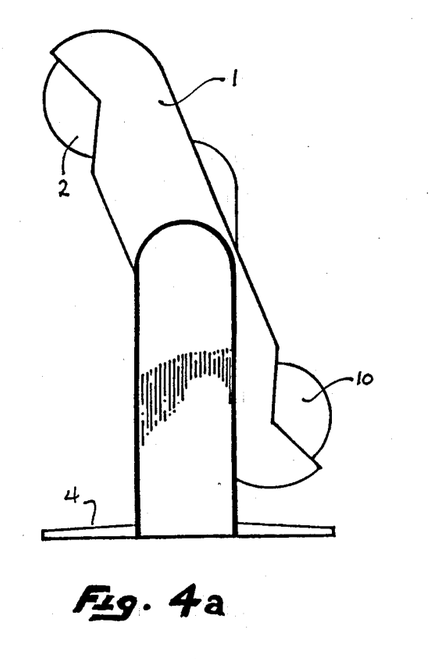
FIGS. 4(a) and (b) show right side and rear elevational views of the invention.
Figure 4B:
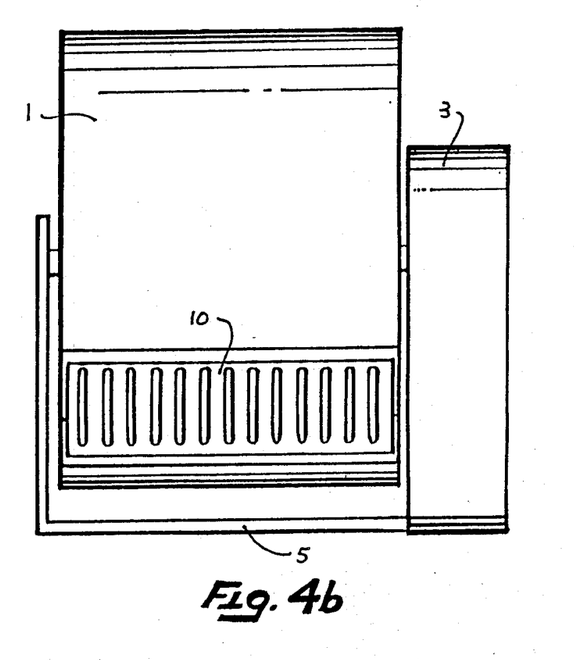

The side view in FIG. 3(a) also reveals the location of the exhaust grille (10) to be symmetrically opposed about the center of rotation of the air processor and oriented, in this view, toward the rear. The preferred operating position shown here inclines the air processor toward the user and enhances operation when the device is used to intake cigarette smoke. FIG. 3(b) pictures the device front-on. FIG. 4 completes the pictorial description of the present invention with the side view of FIG. 4(a) opposed to the side view of FIG. 3(a) and with the rear elevational view of FIG. 4(b). The rear view indicates precisely the location of the exhaust grille (1) at the lower extremity of the air processor (1).

Figure 5:
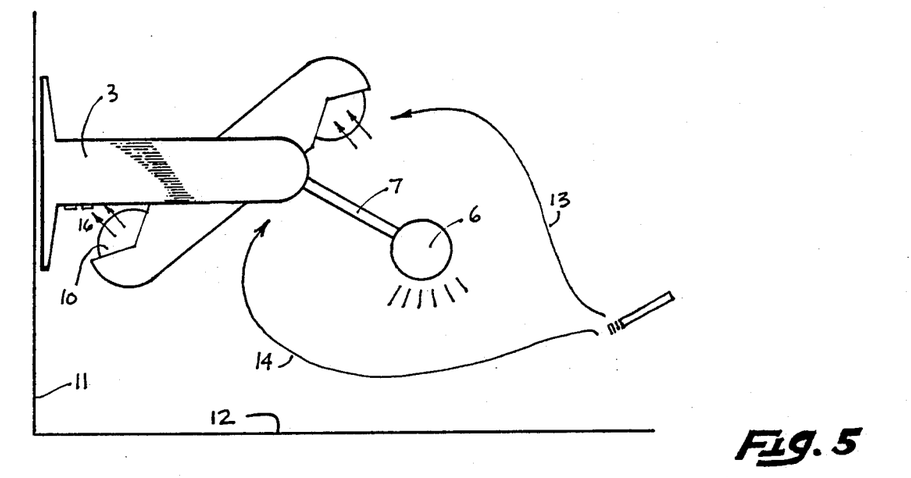
FIG. 5 is a diagrammatic representation of the present invention shown mounted horizontally and projecting outward from a wall or other vertical surface and in relation to a source of cigarette smoke.
Figures 6A, 6B:
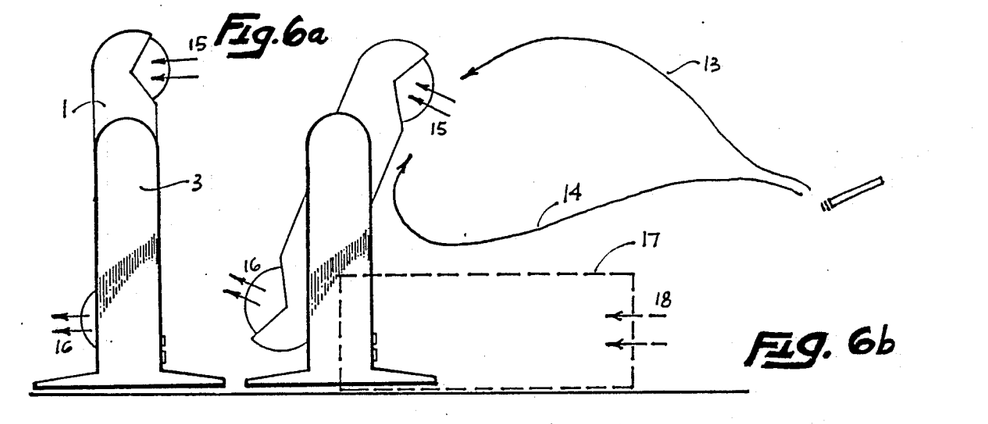
Figures 7A, 7B:
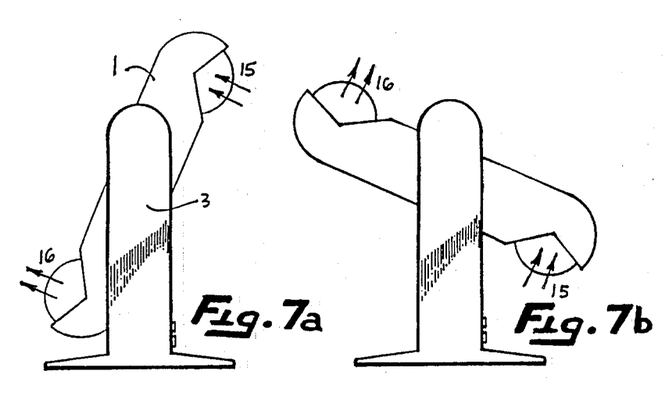
Figure 7C:
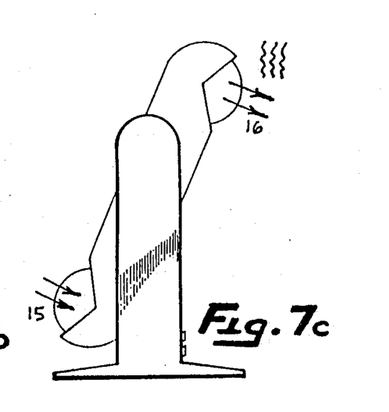

The functional characteristics of the invention are illustrated diagrammatically in FIGS. 5, 6, 7, particularly with respect to improved air flow and versatility when compared to the prior art air purifiers. In FIG. 5, the invention is depicted mounted in a horizontal cantilevered arrangement from an adjacent wall (11) or other vertical surfaces which is adjacent to a desk (12) or worksurface. This arrangement is particularly common in open plan offices with modular partitioned workstations. When the device is mounted as indicated, it obviously takes up no desk space and all of the components can be correctly positioned for optimum use.

As shown in FIG. 5 a source of cigarette smoke is in reasonable proximity to the device. As shown, the natural tendency of the smoke is to rise due to convection and is drawn into the intake grille (2) as shown by intake air (15). This intake is under the influence of negative pressure surrounding the intake grille (2) and a particular volume of rising smoke is taken into the intake grille (1) as part of the intake air (15).

Exhaust air (16) emanating from the exhaust grille (10) also has an influence on surrounding air flow by attracting a current of ambient air. Hence, a portion of the smoke source travels a lower path (14) toward the exhaust flow (16) but is impeded by the slanted body of the air processor (1) and directed back and upwards toward the intake (2). In this sense, the body (1) of the unit acts like a fume hood, trapping and directing the air flow. For smoke removel, the more smoke removed directly before total mixing occurs in the ambient air, the better. Also shown in FIG. 5 is a proper location for the integral task lamp (6) relative to the worksurface (12) which location is adjustable in height and angle.

FIGS. 6(a) and (b) illustrates the device of the present invention on a horizontal surface. In FIG. 6(a), the invention is shown with the rotatable air processing unit (1) in a fully vertical position. Note again, the high location for the intake air flow (15) and the low location exhaust (16) for optimum air flow for smoke removal. The performance of the unit improves when the intake is rotated forward toward the smoke source. As previously discussed, naturally rising smoke is attracted to the negative pressure at the intake grille (2), while a certain portion is attracted downward toward the exhaust air flow, only to be intercepted and redirected up to join the intake flow (15). Shown in dotted profile in this figure is the outline of an ordinary personal desk top air purifier (17). Typically, the intake zone (18) is too low to attract a significant amount of cigarette smoke. The smoke passes over the top of the device to join the exhaust flow and is dispersed into the ambient air.

FIG. 7(a), (b) and (c) specifically illustrate the rotation of the air processing unit (1), the 180° inversion of which converts the present invention from a smoke-removing device to a machine for supplying a directed flow of clean air toward the user. As shown in FIGS. 7(a), (b) and (c) intake grille (2) and exhaust (10) have exchanged positions. Internal to the device is a heating coil which can warm the clean exhaust air as desired for comfort. In this mode of operation, the device of the present invention is in effect a personal desk fan delivering air purified of ambient pollutants and brought to a comfortable temperature.

Figure 8:
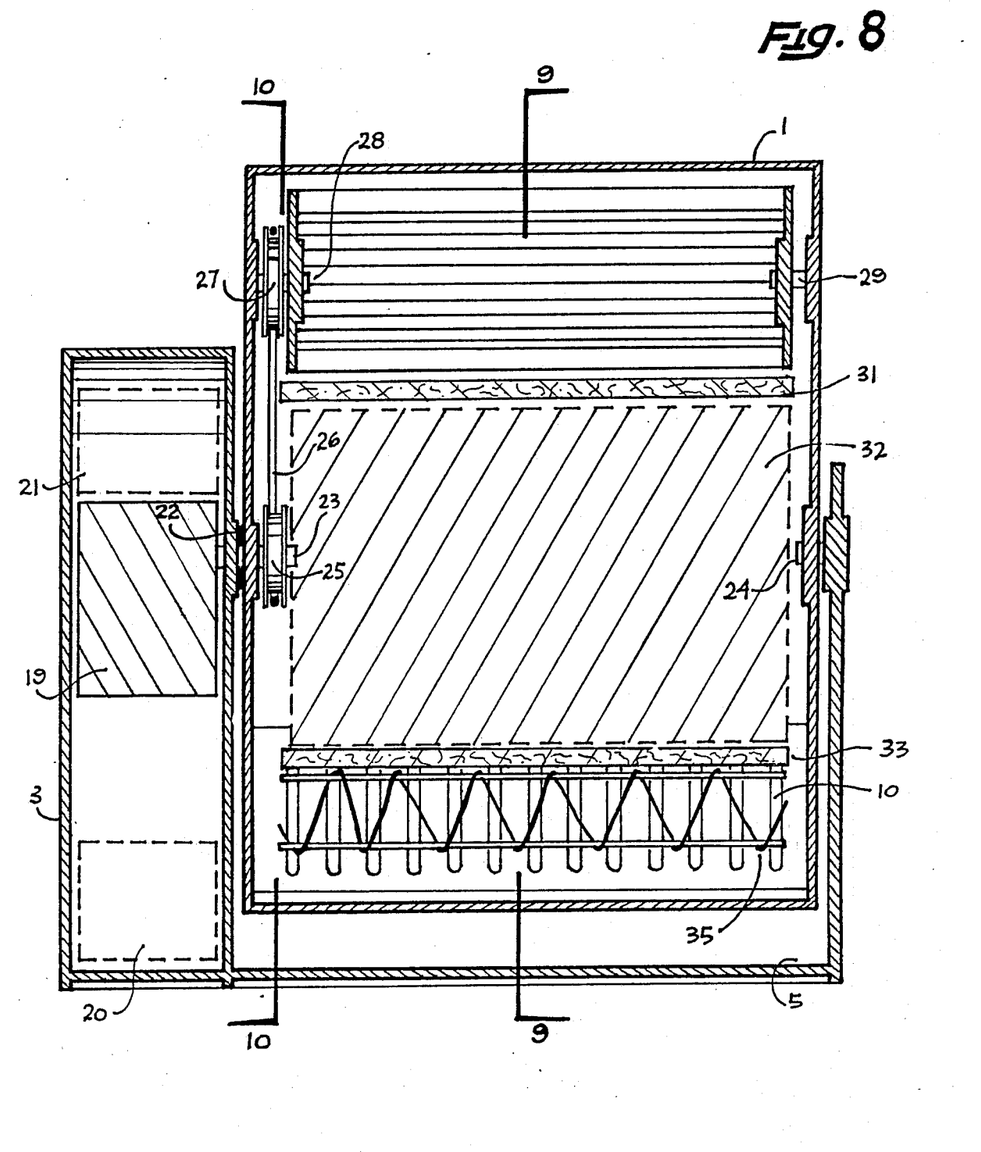
FIG. 8 is a longitudinal sectional through the entire device of the invention showing the location and relationship of all components.

FIG. 8 illustrates the internal functioning of the present invention and as shown the majority of air processing components are contained within the envelope of the air processing unit (1). The remainder of the device effectively constitutes a support for that unit, composed of the structural housing (3) and frame member (5). The structural housing (3) forms an internal cavity which contains an electric motor (19) for powering a blower in the adjacent air processing unit (1). The internal cavity also provides additional space for enclosing components to provide electrical functions of the device (fan, light, heat) and a swivel joint and connecting means (21) for the integrated task lamp and its support arm.

The frame (5) is integral with, or rigidly fixed to the structural housing (3) to form a three-sided support for the air processing unit (1). The assembly contains, two pivots. One pivot (22) is hollow at its center to allow a shaft (23) of the motor (19) to exit the support housing (3) and pass into the interior of the air processing unit. The other pivot (24) is coaxial with the first and mounted at the opposite side of the frame (5) from the structural enclosure (3) and consists of a pin, or the like, to permit free rotation. By these pivots (22, 24), the entire air processing unit may be rotated through 360°.

Motive power is furnished to the air processing unit through an electric motor (19) whose shaft (23) passes through the hollow pivot (22) and terminates in a first pulley (25) which in turn drives a second pulley (27) by a drive belt (26). The second pulley rotates on a first shaft (28) opposed to, and coaxial with, a second corresponding shaft (29), both being mounted within the body of the air processing unit (1). The shafts (28, 29) support and permit rotation of a cross flow blower (30) according to movement of the pulley assembly. The blower (30) is also commonly known as a "squirrel-cage" fan. It is the physical property of such a fan to intake air transversly to its axis of rotation. This will be described in more detail with reference to FIG. 9.

From the point that air enters the device through the cross-flow blower (30), it is forced through a sequence of filters. The first filter is a pre-filter (31) consisting of very course filtration media and for the purpose of removing large particles. The second filter is a main filtration means (32) which may be filter media or electrostatically charged plates. The selection of the particular filter means (32) is independent of the present invention and may be of any of the known types. The third filter is a final filter (33) using activated charcoal which is particularly effective for removal of odor and extremely fine particles.

After being cleaned, air passes to the exterior through the exhaust grille (10), the interior surface of which is visible in FIG. 8. Also shown in FIG. 8 is a heating element (35) for use when the unit is being employed as a clean air fan blowing air toward the user. Power can be supplied to the element by contacts contained in either pivot (22, 24) and controlled by a switch contained in the control means section (20). It is preferable to supply power through the pivot (24) in the frame member (5) since the first pulley (26) may interfere with rotatable electrical contacts.

Figure 9:
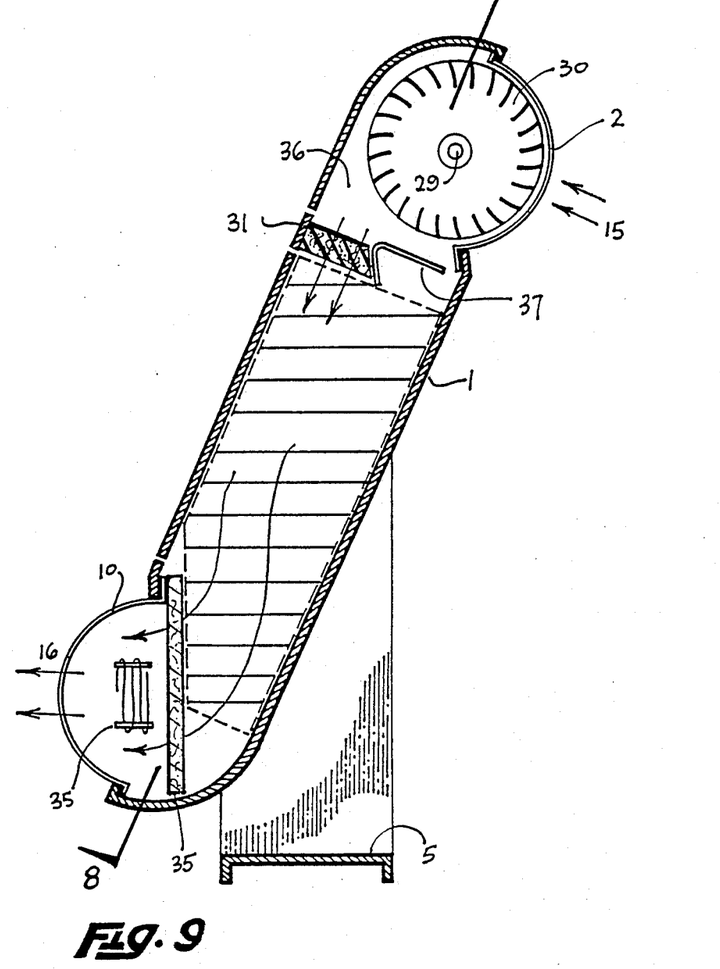
FIG. 9 is a transverse sectional view through the device of the invention showing the relation of all air cleaning components.

FIG. 9 shows the present invention in transverse cross section. As shown in FIG. 9, incoming air (15) passes through openings in the intake grille (2) and into the internal cavity of the cross-flow blower (30). The housing for the blower, which includes a diverting surface (37) spanning the width of the entire air processor unit, is configured to produce an exhaust flow out from the cavity of the blower generally to the area indicated at 36. As previously explained, from this point air passes through the pre-filter (31), major filtration means (electrostatic or media) (32) and a final filter of activated charcoal (33). The heating element (35) is shown diagrammatically in side view. The clean exhaust air (16) exits through the exhaust grille (10).

Figure 10:
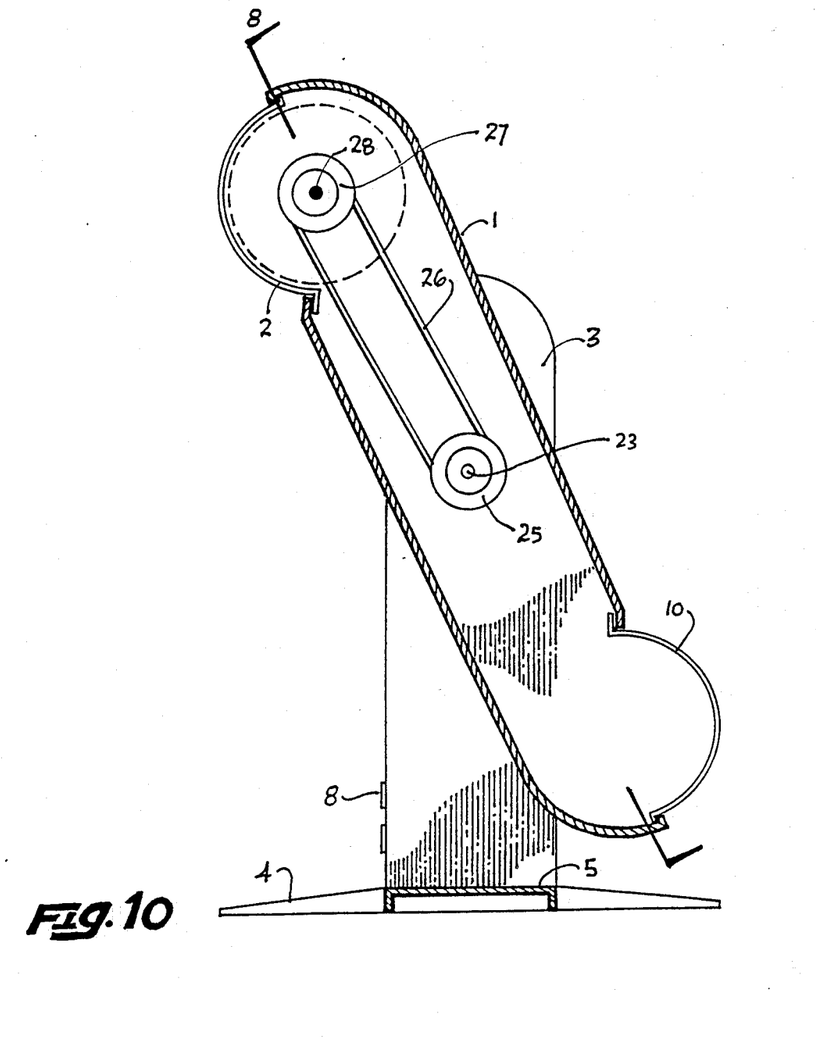
FIG. 10 is a second transverse sectional view through the device of the invention showing a portion of the drive mechanism.

FIG. 10 illustrates in a second transverse cross section, the drive mechanism for the cross flow blower shown in dotted line. Rotation of the motor (19) is transferred through the motor shaft (22) and the drive train consisting of pulleys (25, 27) and belt (26) to the axis of the blower on shaft 28.

Although the invention has been described with reference to a particular embodiment, it is to be appreciated that various adaptations and modifications may be made and the invention is only to be limited by the appended claims.

We claim:

1. A convertible air cleaner comprising:
   an elongated enclosure forming an internal cavity extending along a central longitudinal axis and having a first opening at one end of the enclosure and a second opening at an opposed end of the enclosure and with the openings oriented substantially at 180° from each other and wherein said elongated enclosure includes opposing elongated wall members extending along and parallel to the central longitudinal axis and with the first and second openings each located at an end portion of a wall member at opposite ends of the enclosure to have the openings symmetrically oriented 180° from each other but facing along parallel planes relative to the longitudinal axis;
   support means holding said elongated enclosure at a substantially transverse axis relative to the longitudinal axis between said first and second openings and including pivot means for permitting rotation about said transverse axis between said first and second openings through an arc of at least 180° for converting the relative position of the first and second openings;

air filtration means contained within said enclosure; and fan means positioned within the enclosure for drawing air through said first opening through the internal cavity for filtration by said air filtration means and for exiting to the exterior of said enclosure through said second opening.

2. The convertible air cleaner fan as recited in claim 1 wherein said fan means is a cross-flow blower.

3. The convertible air cleaner fan as recited in claim 1 wherein said air filtration means includes media filters.

4. The convertible air cleaner fan as recited in claim 1 wherein said air filtration means includes an electrostatic filter.

5. The convertible air cleaner fan as recited in claim 1 wherein said air filtration means includes an air activated charcoal filter.

6. The convertible air cleaner fan as recited in claim 1 additionally including a heating means positioned within the enclosure for heating the air drawn through the enclosure to provide for heated air exiting through the second opening.

7. The convertible cleaner fan as recited in claim 1 additionally including motor means located within the support means and with a fan drive means extending through the pivot means for providing rotation of the fan means.

8. The convertible air cleaner fan as recited in claim 1 wherein the support means has U-shaped configuration with upstanding arms to support the elongated enclosure between the upstanding arms and with pivot means on both arm to support the enclosure for rotation.

9. The convertible air cleaner fan as recited in claim 1 additionally including an illumination means mounted on the support means for providing illumination.

10. The convertible air cleaner fan as recited in claim 9 wherein the illumination means is rotatable mounted for adjustment of the illumination.

11. A air cleaner comprising:

an elongated enclosure forming an internal cavity extending along a central longitudinal axis and having a first opening at one end of the enclosure and a second opening at an opposed end of the enclosure and with the openings oriented substantially at 180° from each other;

the elongated enclosure including opposing elongated wall members extending along and parallel to the central longitudinal axis and with the first and second openings each located at an end portion of a wall member at opposite ends of the enclosure to have the openings symmetrically oriented 180° from each other but facing along parallel planes relative to the longitudinal axis, air filtration means contained within said enclosure; and fan means positioned within the enclosure for drawing air through said first opening through the internal cavity for filtration by said air filtration means and for exiting to the exterior of said enclosure through said second opening.

12. The air cleaner fan as recited in claim 11 wherein said fan means is a cross-flow blower.

13. The air cleaner fan as recited in claim 11 wherein said air filtration means includes media filters.

14. The air cleaner fan as recited in claim 11 wherein said air filtration means includes an electrostatic filter.

15. The air cleaner fan as recited in claim 11 wherein said air filtration means includes an air activated charcoal filter.

16. The air cleaner fan as recited in claim 11 additionally including a heating means positioned within the enclosure for heating the air drawn through the enclosure to provide for heated air exiting through the second opening.

17. The air cleaner fan as recited in claim 11 additionally including an illumination means for providing illumination.

18. The air cleaner fan as recited in claim 17 wherein the illumination means is rotatable mounted for adjustment of the illumination.

19. The air cleaner fan as recited in claim 11 additionally including motor means and with a fan drive means for providing rotation of the fan means.

* * * * *